United States Patent [19]
Kusano et al.

[11] Patent Number: 5,425,011
[45] Date of Patent: Jun. 13, 1995

[54] SEMICONDUCTOR INTEGRATED CIRCUIT INCORPORATING PHOTO DETECTORS

[75] Inventors: Toshiaki Kusano, Tokyo; Seiji Takahara, Itami, both of Japan

[73] Assignees: Kyoei Sangyo Co., Ltd.; Mitsubishi Denki Kabushiki Kaisha, both of Tokyo, Japan

[21] Appl. No.: 134,829

[22] Filed: Oct. 12, 1993

[30] Foreign Application Priority Data

Oct. 26, 1992 [JP] Japan .................................. 4-287640

[51] Int. Cl.$^6$ .............................................. G11B 7/13
[52] U.S. Cl. .................... 369/44.25; 369/44.35; 369/44.37; 369/44.29; 369/53; 369/54; 369/120
[58] Field of Search ............... 369/44.25, 44.27, 44.28, 369/44.29, 44.32, 44.34, 44.35, 44.37, 44.41, 44.42, 54, 112, 120, 53; 250/201–205

[56] References Cited

U.S. PATENT DOCUMENTS 5,151,888 9/1992 Shikichi et al. ............... 369/44.25 X
5,235,583 8/1993 Jongenelis et al. .......... 369/44.29 X

OTHER PUBLICATIONS

Patent Abstracts of Japan, vol. 12, No. 457 (E–688), Nov. 30, 1988, JP–A–63 181 372, Jul. 26, 1988.
Patent Abstracts of Japan, vol. 12, No. 217 (E–624), Jun. 21, 1988, JP–A–63 013 368, Jan. 20, 1988.
Patent Abstracts of Japan, vol. 12, No. 417 (P–782), Jul. 11, 1988, JP–A–63 153 733, Jun. 27, 1988.
Transactions of Japan Society of Mechanical Engineers, Apr. 1990, "Recent Directions in Digital Audio Storage Media", Tadao Yoshida, pp. 21–27.
Mitsubishi Denki Kabushiki Kaisha In–House Technical Bulletin, "A General Compilation of Technology in the Field of Photo–Memory and Photo–Electro–Magnetic Memory", Section Three Digital Audio Disk, pp. 2/27–19/27.

*Primary Examiner*—Georgia Y. Epps
*Assistant Examiner*—Muhammad N. Edun
*Attorney, Agent, or Firm*—Oblon, Spivak, McClelland, Maier & Neustadt

[57] ABSTRACT

In response to a test signal received at a test terminal, one terminal of a first computation circuit and three terminals of a second computation circuit are each provided with a reference voltage, or a ground potential, which is available at reference voltage supply terminals associated with photo detectors. Another terminal of the first computation circuit and the second computation circuit are each provided with a detected voltage. If the functions of the computation circuits are not defective, function signals will be obtained each having a value which corresponds to an imbalance between the detected voltage and the reference voltage. Thus, only one test terminal is required, which reduces the size of the semiconductor integrated circuit.

13 Claims, 8 Drawing Sheets

SEMICONDUCTOR INTEGRATED CIRCUIT INCORPORATING PHOTO DETECTORS

BACKGROUND OF THE INVENTION

The present invention relates to a semiconductor integrated circuit incorporating photo detectors like preamplifier ICs, for use in an optical pick-up device of an optical disc player such as a compact disc player and a laser disc player.

FIELD OF THE INVENTION

DESCRIPTION OF THE BACKGROUND ART

A modern optical pick-up device of an optical disc player like a compact disc player includes a semiconductor integrated circuit which incorporates photo detectors such as photo diodes in order to control a positional relation between the optical pick-up device and an optical disc. In a photo detector equipped semiconductor integrated circuit, a tracking error signal needed for tracking servo is generated in accordance with a balance of light input at photo detectors, i.e., how much light is received by the photo detectors. A focusing error signal needed for focusing servo is also generated in accordance with the balance of the light input.

FIG. 1 shows a conventional semiconductor integrated circuit incorporating photo detectors. In FIG. 1, the photo detectors incorporated in the semiconductor integrated circuit comprises a group of photo diodes which is partitioned into six parts which serve as photo detectors 51 to 56. The photo detectors 52 to 55, each having a square configuration, are disposed so as to form an optical switch which is also shaped in a square. The photo detectors 52 to 55 are located midway between the photo detectors 51 and 56 and have a center point CP where the apexes of the photo detectors 52 to 55 each shaped in a square meet. The photo detectors 52 and 54 are disposed catercornered. In a similar manner, the photo detectors 53 and 55 are in a catercornered relation. The photo detectors 51 to 56 on the ends of the photo diode group detect light receiving conditions on the both sides of a predetermined track of a mirror surface of an optical disc while the four photo detectors 52 to 55 at the center detect a distance between a tracking pit, which serves as a part of a signal generating surface of the optical disc, and an object lens.

Current signals from the photo detectors 51 to 56 are converted into voltage signals by current-voltage conversion amplifiers 61 to 66, respectively.

The conventional semiconductor integrated circuit also includes a first computation circuit 71. The first computation circuit 71 subtracts a voltage signal which is available from the current-voltage conversion amplifier 66 from a voltage signal which is available from the current-voltage conversion amplifier 61. An output from the first computation circuit 71 serves as a tracking signal $V_{TR}$.

The conventional semiconductor integrated circuit further includes a second computation circuit 72 which generates a focusing error signal in accordance with voltage signals from the current-voltage conversion amplifiers 62 to 65. The second computation circuit 72 includes two adder circuits 72a and 72b and a subtraction circuit 72c. The adder circuit 72a adds up voltage signals from the current-voltage conversion amplifiers 62 and 66 while adder circuit 72b adds up voltage signals from the current-voltage conversion amplifiers 63 and 65. The subtraction circuit 72c subtracts an output from the adder circuit 72b from an output from the adder circuit 72a. An output from the subtraction circuit 72c, i.e., an output from the second computation circuit 72 serves as a focusing error signal $V_{FE}$.

In the optical pick-up device, the tracking error signal $V_{TR}$ being "0" indicates that there is no tracking error, and the focusing error signal $V_{FE}$ being "0" indicates there is no focusing error. If the tracking error signal $V_{TR}$ is not "0," the conventional semiconductor integrated circuit drives a tracking servomechanism in accordance with the polarity and the absolute value of the tracking error signal $V_{TR}$ so that the optical pick-up device accurately follows tracks. Likewise, if the focusing error signal $V_{Fe}$ is not "0," a focusing servomechanism is driven in accordance with the polarity and the absolute value of the focusing error signal $V_{FE}$ so that the objective lens and the signal generating surface of the optical disc are separated by a certain desired distance.

Thus, such a semiconductor integrated circuit needs to be tested as to its function to find whether it detects the tracking error signal $V_{TR}$ and the focusing error signal $V_{FE}$ as it should, i.e., whether an error signal which correctly reflects a balance of light input is generated. While the semiconductor integrated circuit is under test, the light input to the optical pick-up device must be balanced in a particular desired manner.

To this end, the conventional semiconductor integrated circuit of FIG. 1 includes test terminals 81 to 86 which are disposed on the input side of the current-voltage conversion amplifiers 61 to 66.

The test terminals 81 to 86 are used to test whether the tracking error signal $VT_{TR}$ as precisely needed is generated in the semiconductor circuit (hereinafter referred to as tracking function). A test for the tracking function involves providing different currents or voltages to the test terminals 81 to 86. It is judged whether the tracking error signal $V_{TR}$ available from the first computation circuit 71 has a value which corresponds to the current difference or the voltage difference between the test terminals 81 and 86.

The test terminals 82 to 85 are used to find whether the focusing error signal $V_{FE}$ as precisely needed is generated in the semiconductor circuit (hereinafter referred to as focusing function). To test the focusing function, at least one of the test terminals 82 to 85 is provided with a current or a voltage which is different from those applied to the other test terminals, i.e., the current or the voltage given to the test terminals is imbalanced. It is then judged whether the focusing error signal $V_{FE}$ from the second computation circuit 72 has a value which corresponds to the imbalance of current or voltage.

FIG. 2 shows another approach for creating an imbalance of light input, namely, an optical system 90. The optical system 90 is disposed separately from the semiconductor integrated circuit equipped with the photo detector equipped with; that is, the optical system 90 is used in place of the test terminals 81 to 86. The optical system 90 comprises a light source 91 such as a semiconductor laser, a converging lens 92 for converging light beams from the light source 91, and a reflection mirror 93 for reflecting the light beams which are converged by the converging lens 92 and directing the converged light beams toward the photo detectors 51 to 56. The light beams from the light source 91 are illuminated on the photo detectors 51 to 56 each as a light spot S which is smaller than each one of the photo detectors 51 to 56. The light spots S are scanned on the photo detectors 51 to 56 by changing an angle θ between the reflection mirror 93 and an optical axis of the optical system 90. When the light spots S are scanned in a certain manner, only one of the photo detectors 51 to 56 is illuminated. When the light spots S are scanned in a different manner, the photo detectors 52 to 55 are unevenly illuminated. Hence, the tracking function and the focusing function are tested by detecting whether the tracking error signal $V_{TR}$ from the first computation circuit 71 and the focusing error signal $V_{FE}$ from the second computation circuit 72 have values corresponding to the illumination condition at the photo detectors 51 to 56.

However, the tests of the tracking function and the focusing function are encountered with the following problems.

In the approach as shown in FIG. 1 where the test terminals 81 to 86 are provided in the semiconductor integrated circuit for the sake of the functional tests to detect the tracking and the focusing error signals, the chip size and hence the package size of the semiconductor integrated circuit increase due to the provision of the test terminals 81 to 86. This directly runs counter to the need for size reduction of the optical pick-up device, and in turn, size reduction of the optical disc player such as a compact disc player.

The other approach using the optical system 90 for the purpose of the functional tests, on the other hand, makes it possible to attain a smaller optical pick-up device since the test terminals are unnecessary as described earlier. However, the optical system 90, which is used only for the functional tests, requires various preconditioning to ensure a desired light spot or desired scanning. Hence, the optical system 90 is costly in terms of facilities and preparations it requires for the functional tests.

SUMMARY OF THE INVENTION

A semiconductor integrated circuit incorporating photo detectors of a first aspect of the present invention comprises: four or more photo detectors for outputting detected currents in accordance with their respective light receiving areas; detected current supply terminals each associated with each one of the photo detectors, each one of the detected current supply terminals receiving a detected current from its pertaining photo detector; a plurality of computation circuits provided in association with two or more photo detectors selected from the four or more photo detectors, the computation circuits each receiving as many input signals as its pertaining photo detectors and executing computation needed for desired functions in accordance with the input signals; a test terminal for receiving a test signal; reference voltage supply terminals, at least one of the reference voltage supply terminals being associated with each one of the computation circuits, the reference voltage supply terminals being associated with some of the detected current supply terminals which receive detected currents from the pertaining photo detectors of the selected two or more photo detectors which are associated with the computation circuits; reference voltage supply means for providing the reference voltage supply terminals with a reference voltage; first input signal supply means which, are disposed in association with the reference voltage supply terminals and which are connected to the test terminal, the first input signal supply means each being: responsive to the absence of the test signal at the test terminal to provide its pertaining computation circuit with a detected voltage which is generated by current-to-voltage conversion of a detected current received at a respective one of the detected current supply terminals which is associated with its pertaining reference voltage supply terminal, the detected voltages being given to the computation circuits as input signals; and responsive to the test signal given to the test terminal to provide its pertaining computation circuit with a reference voltage which is received at its pertaining reference voltage supply terminal, the reference voltages being given to the computation circuits as input signals; and second input signal supply means including a current/voltage convertor, the current/voltage convertor converting, into detected voltages, detected currents which are supplied to the detected current supply terminals which are associated with the photo detector except the pertaining photo detector of the selected two or more photo detectors, the second input signal supply means supplying the detected voltages as input signals to input terminals of computation circuits which are associated with the photo detector except the pertaining photo detector of the selected two or more photo detectors.

In a second aspect, the first input signal supply means each include: a current/voltage convertor for converting a detected current supplied to its pertaining detected current supply terminal which is associated with a respective one of the pertaining photo detector of the selected two or more photo detectors into a detected voltage; a detected voltage supply terminal for receiving the detected voltage from the current/voltage convertor; and a switch circuit, the switch circuit connecting the detected voltage supply terminal to its pertaining computation circuit when the test signal is not given to the test terminal, the switch circuit disconnecting the detected voltage supply terminal from the computation circuit and connecting its associated reference voltage supply terminal to the computation circuit when the test signal is given to the test terminal.

Preferably, the desired functions include a tracking function and a focusing function, and therefore, the encountered application of the semiconductor integrated circuit is an use within an optical pick-up device of an optical disc player.

Preferably, photo detectors for the tracking function include photo detectors for detecting light reflected at a mirror surface on the outer periphery side of a track of an optical disc and photo detectors for detecting light reflected at a mirror surface on the inner periphery side of the track.

Four photo detectors arc provided for testing the focusing function, the four photo detectors being disposed checkerwise so their light receiving areas are contiguous to each other. Reflected light from the signal generating surface of the optical disc being converged by astigmatism method so that the four photo detectors receive the converged light at a center portion of their light receiving areas taken as a whole.

In a third aspect, the semiconductor integrated circuit of the first aspect further comprises: control means, the control means generating a first predetermined signal in response to the absence of the test signal at the test terminal, the control means generating a second predetermined signal in response to the test signal received at the test terminal; detected voltage supply terminals corresponding to the reference voltage supply terminals; and input signal supply circuits, each one of the input signal supply circuits connecting its pertaining detected voltage supply terminal and its pertaining reference voltage supply terminal to the same input terminal of its associated computation circuit. The first input signal supply means each include a current/voltage convertor equipped with a switching circuit, the current/voltage convertor in response only to the first predetermined signal converts a detected current which is supplied to its associated detected current supply terminal which is connected to a respective one of the pertaining photo detector of the selected two or more photo detectors into a detected voltage; and the reference voltage supply means each include a switch circuit, the switch circuit providing its pertaining reference voltage supply terminal with the reference voltage in response only to the second predetermined signal.

In the semiconductor integrated circuit of the third aspect, the desired functions include a tracking function and a focusing function, and therefore, the encountered application of the semiconductor integrated circuit is an use within an optical pick-up device of an optical disc player.

In the semiconductor integrated circuit of the third aspect, the photo detectors for the tracking function include photo detectors for detecting light reflected at a mirror surface on the outer periphery side of a track of an optical disc and photo detectors for detecting light reflected at a mirror surface on the inner periphery side of the track.

In the semiconductor integrated circuit of the third aspect, preferably four photo detectors are provided for testing the focusing function, the four photo detectors being disposed checkerwise so their light receiving areas are contiguous to each other, reflected light from the signal generating surface of the optical disc being converged by astigmatism method so that the four photo detectors receive the converged light at a center portion of their light receiving areas taken as a whole.

In the semiconductor integrated circuit of the third aspect, the current/voltage convertor each equipped with a switching circuit of the first input signal supply means and the switch circuits of the reference voltage supply means are transistor circuits, and the first and the second predetermined signals are bias voltages.

Thus, in the semiconductor integrated circuit of the first aspect, the first input signal supply means each convert a detected current given thereto from the associated photo detector via the associated detected current supply terminal into a detected voltage when the test signal is not given to the test terminal. The first input signal supply means then supply the detected voltages thus generated to the respective computation circuits as the input signals. The computation circuits then process the input signals given thereto from the first and the second input signal supply means in order to test the desired functions. In the opposite case where the test signal is given to the test terminal, the first input signal supply means each supply the reference voltage received at its reference voltage supply terminal to the associated computation circuit as the input signal. That is, each computation circuit receives the reference voltage via at least one of its input terminals and the detected voltages at the other two or more input terminals. The reference voltage and the detected voltage are in an imbalanced relation in terms of value. The computation circuits will each yield a computation result which corresponds to the imbalance between the reference voltage and the detected voltage if the desired functions of computation circuits are not defective.

In the semiconductor integrated circuit of the second aspect, the detected currents detected at all photo detectors are converted into detected voltages by the current/voltage convertor of the first and the second input signal supply means. When no test signal is received at the test terminal, the first input signal supply means connect the detected voltage supply terminals to the input terminals of the computation circuits and disconnect the reference voltage supply terminals from the input terminals of the computation circuits. This connecting and disconnecting are accomplished by switching actions of the switch circuit of the first input signal supply means. Hence, each detected voltage which corresponds to each photo detector is supplied to the associated computation circuit for the sake of a desired function test. On the other hand, when the test signal is given to the test terminal, the first input signal supply means disconnect the detected voltage supply terminals from the input terminals of the computation circuits and connect the reference voltage supply terminals to the input terminals of the computation circuits. This connecting and disconnecting are also accomplished by switching actions of the switch circuit of the first input signal supply means. Hence, each computation circuit receives the reference voltage via at least one of its input terminals and the detected voltages at the other input terminal.

In the semiconductor integrated circuit of the third aspect, the first input signal supply means convert the detected currents into the detected voltages and give the detected voltages to the respective computation circuits only in response to the absence of the test signal at the test terminal. Hence, each detected voltage which corresponds to each photo detector is supplied to the associated computation circuit for the sake of a desired functional test. In the opposite case where the test signal is given to the test terminal, the first input signal supply means give the reference voltages to the input terminals of the respective computation circuits. That is, each computation circuit receives the reference voltage via at least one of its input terminals and the detected voltage via its remaining input terminals.

As described above, according to the first to the third aspects of the invention, the functional tests are accomplished by judging whether each computation circuit has produced an output which precisely reflects an imbalance between a detected voltage and a reference voltage which are received by the computation circuit. This allows that only one test terminal is provided in the semiconductor integrated circuit, which best restrains the expansion of the space needed in the semiconductor integrated circuit to include a test terminal and hence leads to size reduction of an apparatus which uses the photo detector equipped semiconductor integrated circuit.

In addition, the most efficient reduction in the space for the test terminal as above accompanies neither a costly test apparatus nor a complex test method. Thus, the semiconductor integrated circuit incorporating photo detectors of the present invention is advantageous in terms of not only the device size but also overall costs for the tests.

Accordingly, an object of the present invention is to obtain a photo detector equipped semiconductor integrated circuit which requires less cost for functional tests and which has a reduced size.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4A illustrates a principal beam which detects a pit which is on the center of a track; FIG. 4B illustrates a case where the center of the principal beam is off the center of the track towards a top side of the drawing, and FIG. 4C illustrates the center of the principal beam is off the center of the track towards a bottom side of the drawing;

FIG. 5A illustrates a spot on the photo detectors which becomes oblong lengthwise when the objective lens is nearer the signal generating surface than it should be, FIG. 5B illustrates an in-focus condition where a spot on the photo detectors is circular, and FIG. 5C illustrates the spot on the photo detectors in an out-of-focus condition where the objective lens is too far from the optical disc

DESCRIPTION OF THE PREFERRED EMBODIMENTS

Figure 1:
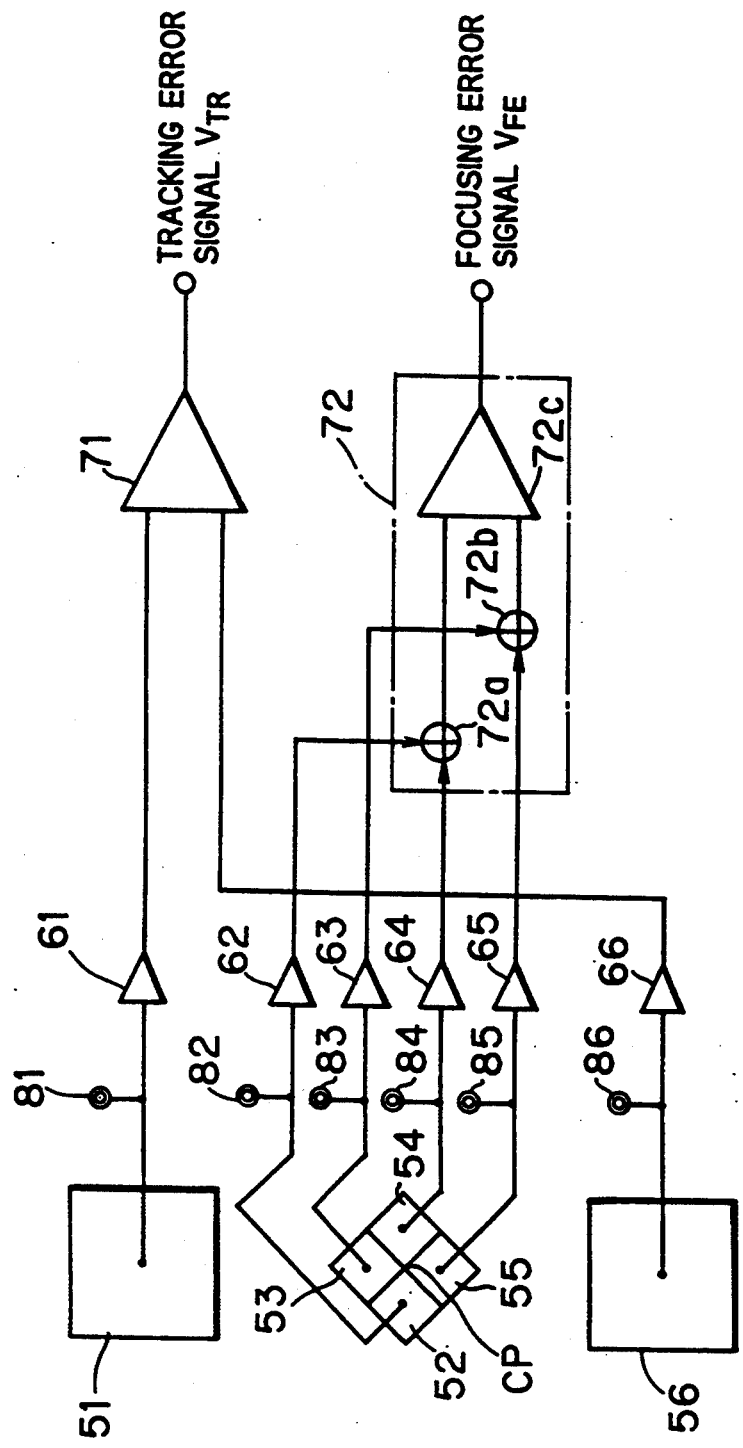
FIG. 1 is a block diagram of a conventional semiconductor integrated circuit equipped with photo detectors.
Figure 2:
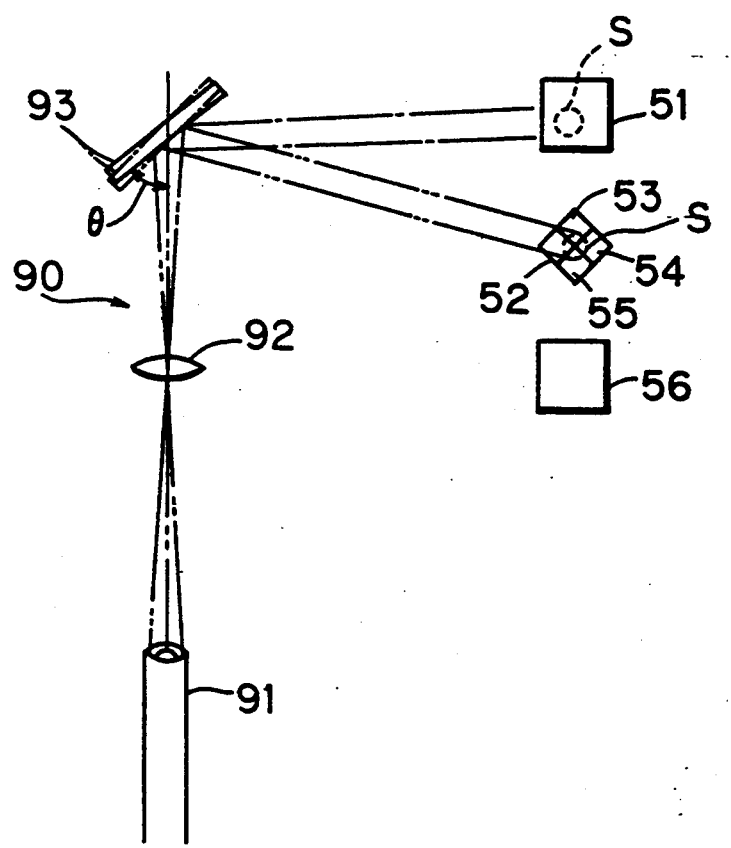
FIG. 2 is a diagram for explaining a conventional test apparatus for functional test.
Figure 3:
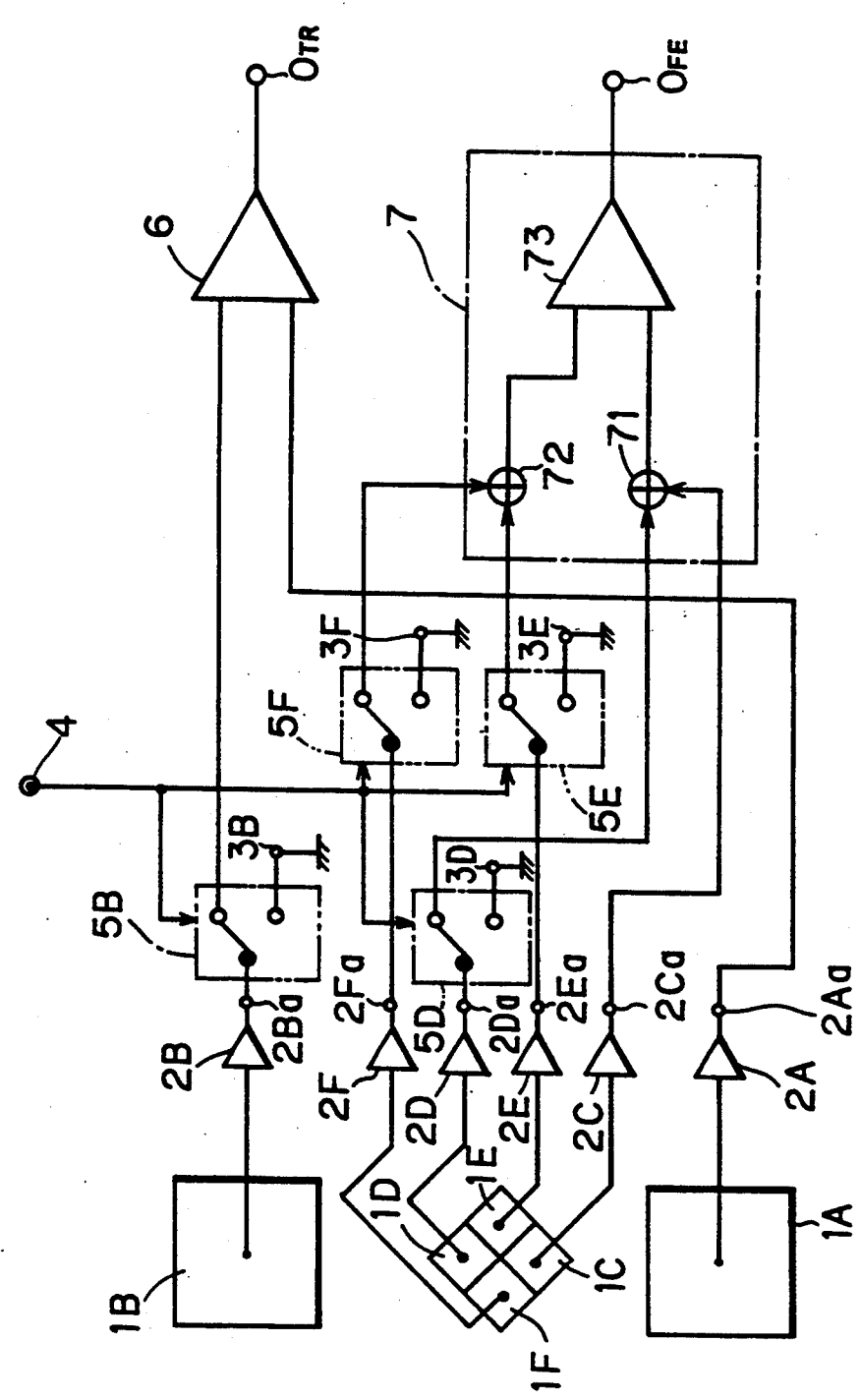
FIG. 3 is a block diagram of a semiconductor integrated circuit equipped with photo detectors according to a first preferred embodiment of the present invention.

FIG. 3 shows a semiconductor integrated circuit incorporating photo detectors according to a first preferred embodiment of the present invention. The circuit is used in an optical pick-up device of an optical disc player such as a compact disc player.

The semiconductor integrated circuit comprises a photo diode group. The photo diode group is divided into six parts and the respective parts of the photo diode group serve as light receiving parts of photo detectors 1A to 1F. The semiconductor integrated circuit also comprises current/voltage convertors 2A to 2F, reference voltage supply terminals 3B and 3D to 3F, a test terminal 4, switch circuits 5B and 5D to 5F, a tracking error computation circuit 6 and a focusing error computation circuit 7.

The photo detectors 1A to 1F are each operable to output a detected current. A detected current of each photo detector corresponds to its respective light receiving area.

Figure 4A:
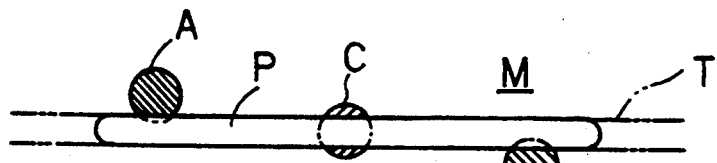
FIGS. 4A, 4B, and 4C are diagrams for explaining a tracking function.
Figure 4B:
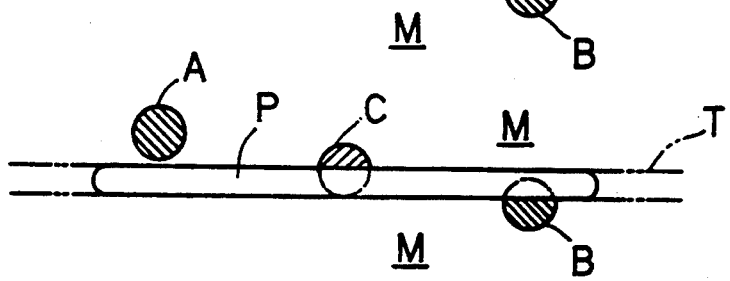
Figure 4C:
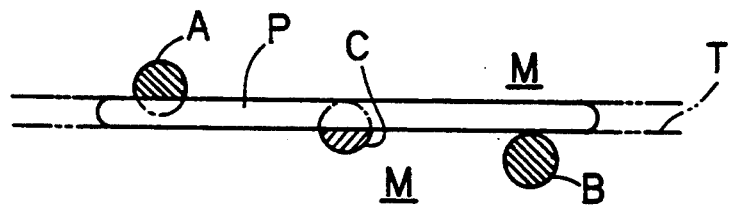

The photo detectors 1A and 1B detect light which is reflected at a non-pitted area of the mirror surface of the signal generating surface of an optical disc under pick-up detection. More precisely, the photo detectors 1A and 1B receive and detect beams A and B illuminated on the signal generating surface of the optical disc, respectively as shown in FIGS. 4A to 4C. For convenience of illustration, a track T is depicted as extending straight in FIGS. 4A to 4C.

When the center of a principal beam C, which detects a pit P on the track T, coincides with the center of the track T as shown in FIG. 4A, the beams A and B equally illuminate a mirror surface M on the both sides of the track T (shadowed portions). As the center of the principal beam C deviates from the center of the track T, one of the beams A and B illuminates an accordingly larger portion of the mirror surface M next to the track T than the other of the beams A and B does. FIG. 4B shows where the center of the principal beam C is off the center of the track T to the top side of the drawing. In this case, the mirror surface M is illuminated in a lager area with the beam A and in a smaller area with the beam B. FIG. 4C shows an opposite case where the center of the principal beam C is deviated to the bottom side of the drawing, causing the beam B to illuminate a larger area and the beam A to illuminate a smaller area of the mirror surface M.

The photo detector 1A receives a reflected light beam which is produced by the illumination of the mirror surface M with the beam A, and outputs a detected current which corresponds to the illuminated area of the beam A. Likewise, the photo detector 1B receives a reflected light which is produced by the illumination of the mirror surface M with the beam B, and outputs a detected current which corresponds to the illuminated area of the beam B.

The photo detectors 1C to 1F detect a distance between the objective lens and the signal generating surface of the optical disc so that the principal beam C is illuminated from an appropriate distance. The semiconductor integrated circuit of the first preferred embodiment is suitable for utilizing astigmatism to detect the distance between the objective lens and the signal generating surface. Hence, the light receiving parts of the photo detectors 1C to 1F are each equal to a quarter of a square-shaped photo diode group divided into four smaller squares. The detection of the distance between the objective lens and the signal generating surface utilizing astigmatism is well known in the art and therefore will not be described in detail.

Figure 5A:
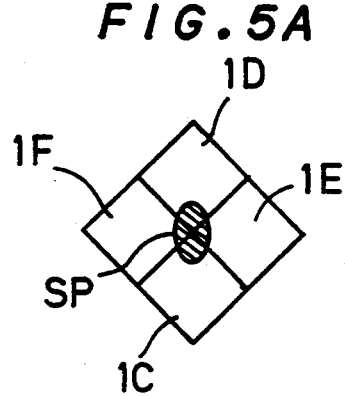
FIGS. 5A, 5B, and 5C are diagrams for explaining a focusing function.
Figure 5B:
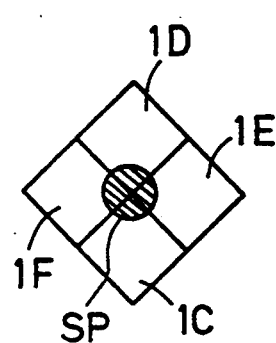
Figure 5C:
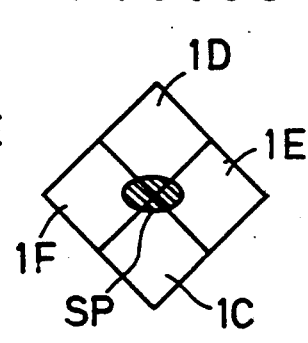

If the distance between the objective lens and the signal generating surface is a desired distance, a light beam reflected at the signal generating surface is imaged on the photo detectors 1C to 1F as a completely round circle spot SP which has a center coinciding with an intersection of partitions between the photo detectors 1C to 1F (FIG. 5B). If the objective lens is nearer the signal generating surface than it should be, the spot SP on the photo detectors 1C to 1F becomes oblong lengthways (FIG. 5A). On the other hand, if the objective lens is away from the signal generating surface than it should be, the spot SP on the photo detectors 1C to 1F becomes oblong sideways (FIG. 5C). The spot SP becomes longer side to side with an increasing distance between the objective lens and the optical disc.

In other words, when the objective lens and the signal generating surface of the optical disc have a suitable distance therebetween, the photo detectors 1C to 1F receive the same amounts of uniform intensity light as shown in FIG. 5B and output detected currents of the same value. As understood from FIG. 5A, if the objective lens is nearer the signal generating surface than it should be, more light is received by the photo detectors 1C and 1D than by the photo detectors 1E and 1F, detected currents from the photo detectors 1C and 1D thereby becoming larger than those from the photo detectors 1E and 1F. If the objective lens is away from the signal generating surface than it should be as shown in FIG. 5C, more light is received by the photo detectors 1E and 1F than by the photo detectors 1C and 1D, causing that detected currents from the photo detectors 1E and 1F become larger than those from the photo detectors 1C and 1D.

The current/voltage conversion circuits 2A to 2F convert the detected currents from the photo detectors 1A to 1F into voltages. The converted voltages are then outputted to detected voltage supply terminals 2Aa to 2Fa as the detected voltages from the photo detectors 1A to 1F, respectively.

The reference voltage supply terminals 3B and 3D to 3F function in association with the detected voltage supply terminals 2Ba and 2Da to 2Fa, respectively. The reference voltage supply terminals 3B and 3D to 3F are grounded.

The test terminal 4 is kept at a logical low level in the regular circuit operation and receives a logical high signal in the tests of the tracking function and the focusing function.

The switch circuit 5B selects one of the detected voltage supply terminal 2Ba and the reference voltage supply terminal 3B, which are associated terminals of the photo detector 1B, for connection to an input terminal of the tracking error computation circuit 6. In its regular operation, the switch 5B connects the detected voltage supply terminal 2Ba to the input terminal of the tracking error computation circuit 6. When driven by a test signal given to the test terminal 4, the switch 5B disconnects the detected voltage supply terminal 2Ba from the input terminal of the tracking error computation circuit 6, and selects the reference voltage supply terminal 3B for connection.

Figure 6:
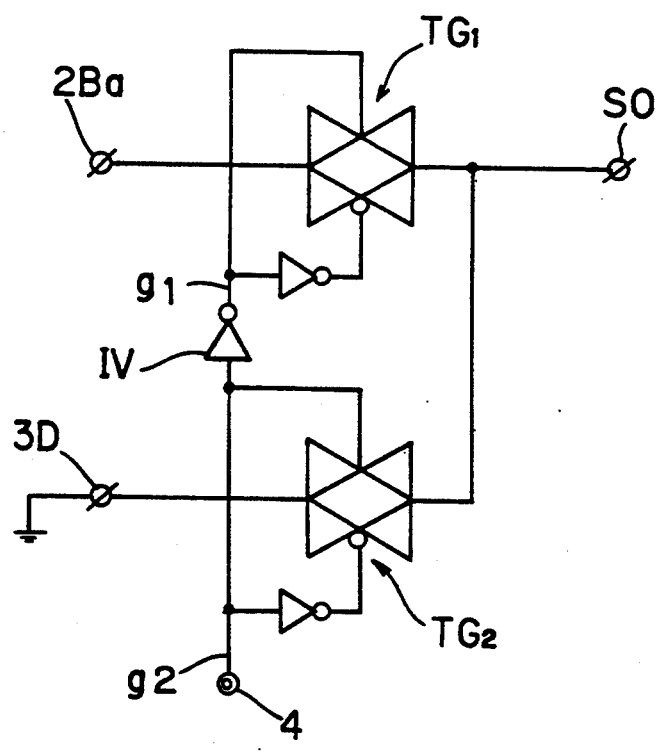
FIG. 6 is a circuitry diagram showing one preferred embodiment of a switch circuit.

For example, the switch 5B is formed by two transmission gates TG1 and TG2 as combined together (FIG. 6).

In FIG. 6, an input terminal of the transmission gate TG1 is connected to the detected voltage supply terminal 2Ba and an input terminal of the transmission gate TG2 is connected to the reference voltage supply terminal 3B. Output terminals of the transmission gates TG1 and TG2 are connected to a connection terminal so for connection to the focusing error computation circuit 7. As input line g1 on which a control signal is supplied to the first transmission gate TG1 is connected via an invertor IV to an input line g2 on which the control signal is supplied to the second transmission gate TG2. The input line g2 is also connected to the test terminal 4.

The transmission gate TG2 turns off and the transmission gate TG1 turns on in response to the logical low signal received at the test terminal 4, whereby a detected voltage given to the detected voltage supply terminal 2Ba is available at the output terminal so. On the other hand, the logical high signal applied to the test terminal 4 turns on the transmission gate TG2 and turns off the transmission gate TG1. In this case, the ground potential, which is impressed on the reference voltage supply terminal 3B, is available at the output terminal SO.

The switches 5D to 5F select the detected voltage supply terminals 2Da to 2Fa or the reference voltage supply terminals 3D to 35F, which are associated with the photo detectors 1D to 1F, for connection to an input terminal of the focusing error computation circuit 7, respectively. Each switch connects its pertaining detected voltage supply terminal to the input terminal of the focusing error computation circuit 7 in its regular operations. When the test terminal 4 is at the logical high, the switches 5D to 5F cut off the voltage supply from their respective detected voltage supply terminals to the focusing error computation circuit 7, and connect the reference voltage supply terminals 3D to 3F to the input terminal of the focusing error computation circuit 7, respectively.

The switches 5D to 5F may each have exactly the same structures as the switch 5B of FIG. 6, in which case they operate in the same manner as the switch 5B as described in relation to FIG. 6. Hence, the similar description of the operations will not be repeated here.

The tracking error computation circuit 6 comprises two input terminals, one for receiving an input signal $S_A$ and the other for receiving an input signal $S_B$. The tracking error computation circuit 6 generates a tracking error signal $S_{TR}$. The tracking error signal $S_{TR}$ is proportional to a difference between the input signals $S_A$ and $S_B$ as below:

$$S_{TR} = G1(S_A - S_B) \qquad (1)$$

where G1 is any desired constant. The tracking error signal $S_{TR}$ is then outputted at an output terminal $Q_{TR}$ of the tracking error computation circuit 6.

In the first preferred embodiment, a detected current generated at the photo detector 1A is converted by the current/voltage conversion circuit 2A to obtain a detected voltage $V_A$, and the detected voltage $V_A$ is used as the input signal $S_A$. A detected current generated at the photo detector 1B is converted by the current/voltage conversion circuit 2B to obtain a detected voltage VB, and the detected voltage VB is used as the input signal $S_B$. A reference voltage $V_O$, which is the ground potential supplied to the reference voltage supply terminal 3B, is alternatively used as the input signal $S_B$. As is clearly understood from the foregoing, the input signal $S_B$ is switched from the detected voltage VB to the reference voltage $V_O$ or vice versa by the switching action of the switch 5B.

The focusing error computation circuit 7 comprises four input terminals, adder circuits 71 and 72 and a subtraction circuit 73. The adder circuit 71 adds up an input signal $S_C$ given to a first input terminal and an input signal $S_D$ given to a second input terminal. The adder circuit 72 adds up an input signal $S_E$ given to a third input terminal and an input signal $S_F$ given to a fourth input terminal. The subtraction circuit 73 subtracts an output from the adder circuit 72 from an output from the adder circuit 71, and calculates a signal value which is proportional to the difference between the two outputs from the two adder circuits. An output from the subtraction circuit 73 is outputted at an output terminal $Q_{FE}$ as an output of the focusing error computation circuit 7, i.e., as a focusing error signal $S_{FE}$.

Thus, the focusing error signal $S_{FE}$ is obtainable as:

$$S_{FE} = G2\{(S_C + S_D) - (S_E + S_F)\} \qquad (2)$$

where G2 is any desired constant.

In the first preferred embodiment, a detected current generated at the photo detector 1C is converted in the current/voltage conversion circuit 2C to obtain a detected voltage $V_C$, and the detected voltage $V_C$ is used as the input signal $S_C$. Detected currents generated at the photo detectors 1D, 1E and 1F are converted in the current/voltage conversion circuits 2D, 2E and 2F to obtain detected voltages $V_D$, $V_E$ and $V_F$ which are used as the input signals $S_D$, $S_E$ and $S_F$, respectively. The reference voltage $V_O$, which is the ground potential supplied to the reference voltage supply terminals 3D, 3E and 3F, is otherwise used as the input signals $S_D$, $S_E$ and $S_F$. The input signals $S_D$, $S_E$ and $S_F$ are switched from the detected voltages $V_D$, $V_E$ and $V_F$ to the reference voltage $V_O$ or vice versa by the switching actions of the switches 5D, 5E and 5F.

When the semiconductor integrated circuit incorporating the photo detectors is in its regular operations, that is, when the test terminal 4 is kept at the logical low level, the detected voltage supply terminal 2Ba is connected to the input terminal of the tracking error computation circuit 6 by the switch 5B and the detected voltage supply terminals 2Da, 2Ea and 2Fa are connected to the input terminal of the focusing error computation circuit 7 by the switches 5D, 5E and 5F, respectively. Hence, the tracking error signal $S_{TR}$ is derived from the detected currents available at the photo switches 1A and 1B in accordance with Eq. 1 and outputted from the semiconductor integrated circuit. At the same time, semiconductor integrated circuit generates the focusing error signal $S_{FE}$ from the detected currents available at the photo switches 1C to 1F according to Eq. 2 and outputs the same.

As Eq. 1 clearly shows, the tracking error signal $S_{TR}$ is "0" when the input signal $S_A$, which is obtained by current-to-voltage conversion of the detected current detected by the photo switch 1A, is equal to the input signal $S_B$, which is obtained by current-to-voltage conversion of the detected current detected by the photo switch 1B. In other words, when the mirror surface M is illuminated on the inner diameter side of the track T with the beam A as much as it is illuminated on the outer diameter side of the track T with the beam B as shown in FIG. 4A, the tracking error signal $S_{TR}$ becomes "0" regardless of the intensities of the reflected light beams received by the photo detectors 1A and 1B. If the illuminated areas of the mirror surface M illuminated with the beams A and B are not equal to each other as shown in FIGS. 4B and 4C, i.e., when the center of the principal beam C is off the center of the track T, the tracking error signal $S_{TR}$ is generated which reflects the direction and the quantity of the deviation of the center of the principal beam C from the center of the track T.

On the other hand, as clearly understood from Eq. 2, the focusing error signal $S_{FE}$ is "0" when the sum of the input signals $S_C$ and $S_D$, which are the detected currents from the photo detectors 1C and 1D as current-to-voltage converted, is equal to the sum of the input signals $S_E$ and $S_F$, which are the detected currents from the photo switches 1E and 1F as current-to-voltage converted. That is, the focusing error signal $S_{FE}$ of "0" is attained when the reflected light beam from the signal generating surface of the optical disc is imaged on the photo detectors 1C to 1F as a completely round circle spot SP which has a center coinciding with the intersection of the partitions between the photo detectors 1C to 1F (FIG. 5B). When the spot SP is oblong lengthways (FIG. 5A), the focusing error signal $S_{FE}$ is larger than zero and its absolute value represents the positional deviation of the objective lens toward the optical disc. When the spot SP is oblong sideways (FIG. 5C), the focusing error signal $S_{FE}$ is smaller than zero and its absolute value represents the positional deviation of the objective lens away from the optical disc.

Thus, the photo detector equipped semiconductor integrated circuit of FIG. 3 outputs the signal $S_{TR}$ which corresponds to a tracking error and the signal $S_{FE}$ which corresponds to a focusing error when the test terminal 4 is at the logical low level.

A logical high test signal supplied to the test terminal 4 calls for the switching action of the switch 5B. That is, the switch 5B disconnects the detected voltage supply terminal 2Ba from the input terminal of the tracking error computation circuit 6 and selects the reference voltage supply terminal 3B for connection to the tracking error computation circuit 6.

This allows that $S_B=0$ is satisfied in Eq. 1, and hence, a tracking function signal $S_{TRT}=G1 \cdot S_A$ is outputted at the output terminal $Q_{TR}$ of the tracking error computation circuit 6. The tracking function signal $S_{TRT}$ is dependent only on the input signal $S_A$, or the detected voltage detected by the photo detector 1A, if the tracking error computation circuit 6 is not out of its normal function. Hence, it is possible to test the tracking function by finding whether tracking function signal $S_{TRT}$ changes in accordance with the intensity of an illuminated laser beam.

The logical high test signal supplied to the test terminal 4 also calls for the switching actions of the switches 5D to 5F. Thus, the switches 5D to 5F disconnect the detected voltage supply terminals 5Da to 5Fa from the input terminal of the focusing error computation circuit 7 and connect reference voltage supply terminals 3D to 3F to the input terminal of the focusing error computation circuit 7.

This switching actions cause $S_D=S_E=S_F=0$ to be satisfied in Eq. 2, which in turn results in that a focusing function signal $S_{FET}=G2 \cdot S_C$ is outputted at the output terminal OFE of the focusing error computation circuit 7. The focusing function signal $S_{FET}$ is dependent only on the input signal $S_C$, or the detected voltage detected by the photo detector 1C, if the focusing error computation circuit 7 is not out of its normal function. Hence, it is possible to test the focusing function by finding whether focusing function signal $S_{FET}$ changes in accordance with the intensity of an illuminated laser beam.

Thus, the semiconductor integrated circuit of FIG. 3 enables easy functional tests of the tracking and the focusing functions. What is needed for the functional tests is only to supply a logical high test signal to the test terminal 4.

Figure 7:
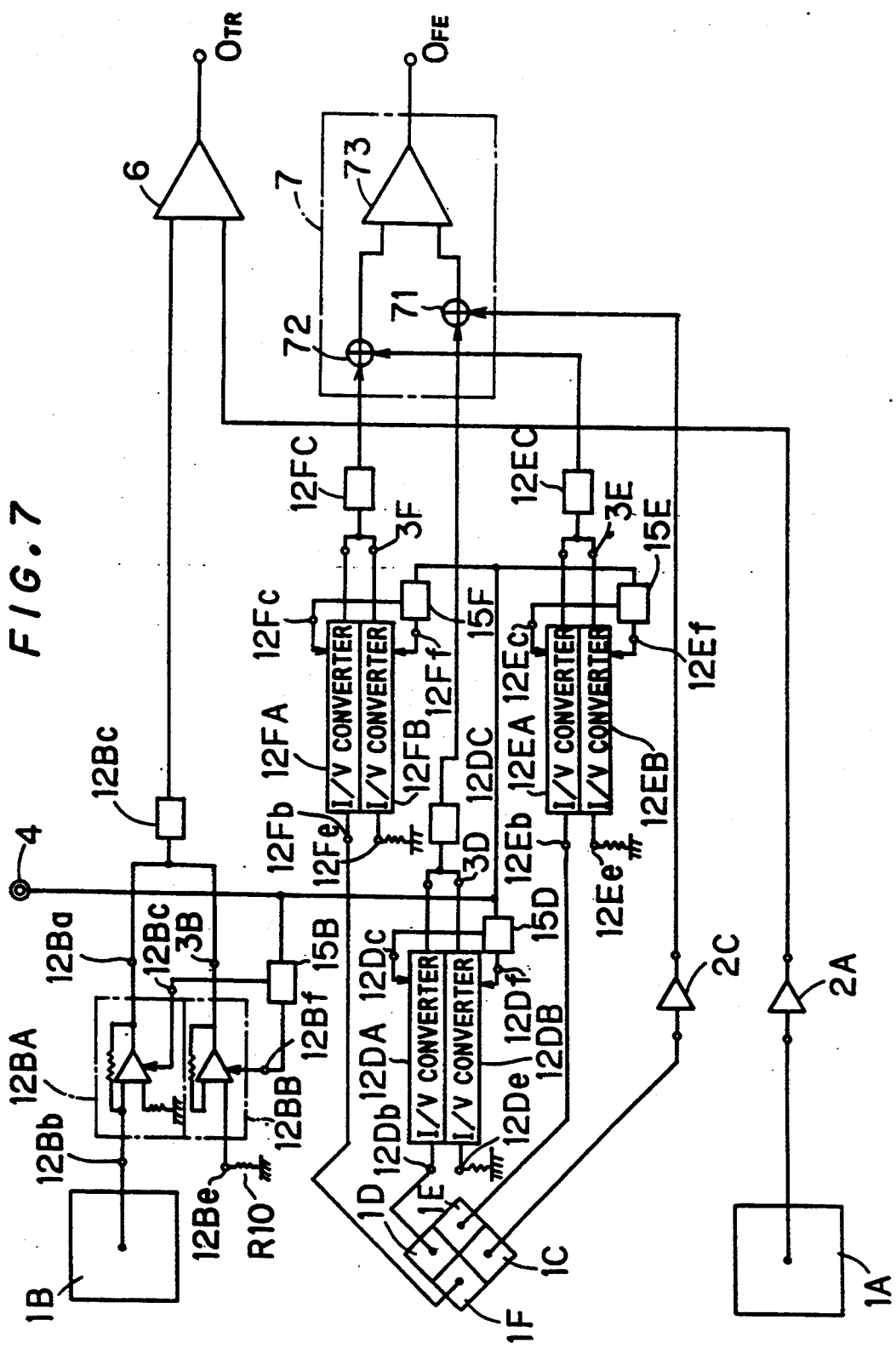
FIG. 7 is a block diagram of a semiconductor integrated circuit equipped with photo detectors according to a second preferred embodiment of the present invention.

FIG. 7 shows a semiconductor integrated circuit incorporating photo detectors according to a second preferred embodiment of the present invention. Elements constituting the semiconductor integrated circuit of FIG. 7 include: photo detectors 1A to 1F; current/voltage conversion circuits 2A and 2C; current/voltage conversion circuits 12BA and 12DA to 12FA for detected signals; current/voltage conversion circuits 12BB and 12DB to 12FB for converted signals; converted signal output circuits 12BC and 12DC to 12FC; reference voltage supply terminals 3B and 3D to 3F; a test terminal 4; bias control circuits 15B and 15D to 15F; a tracking error computation circuit 6; and a focusing error computation circuit 7. In the second preferred embodiment, the test terminal 4 stays at the logical high level during the regular operation and is switched to the logical low level by a logical low test signal for the functional test purpose. Of the above elements, the following elements are the same as the corresponding elements of the semiconductor integrated circuit of FIG. 3, and therefore will not be explained in detail here: the photo detectors 1A to 1F; the current/voltage conversion circuits 2A and 2C; the reference voltage supply terminals 3B and 3D to 3F; the tracking error computation circuit 6; and the focusing error computation circuit 7.

Figure 8:
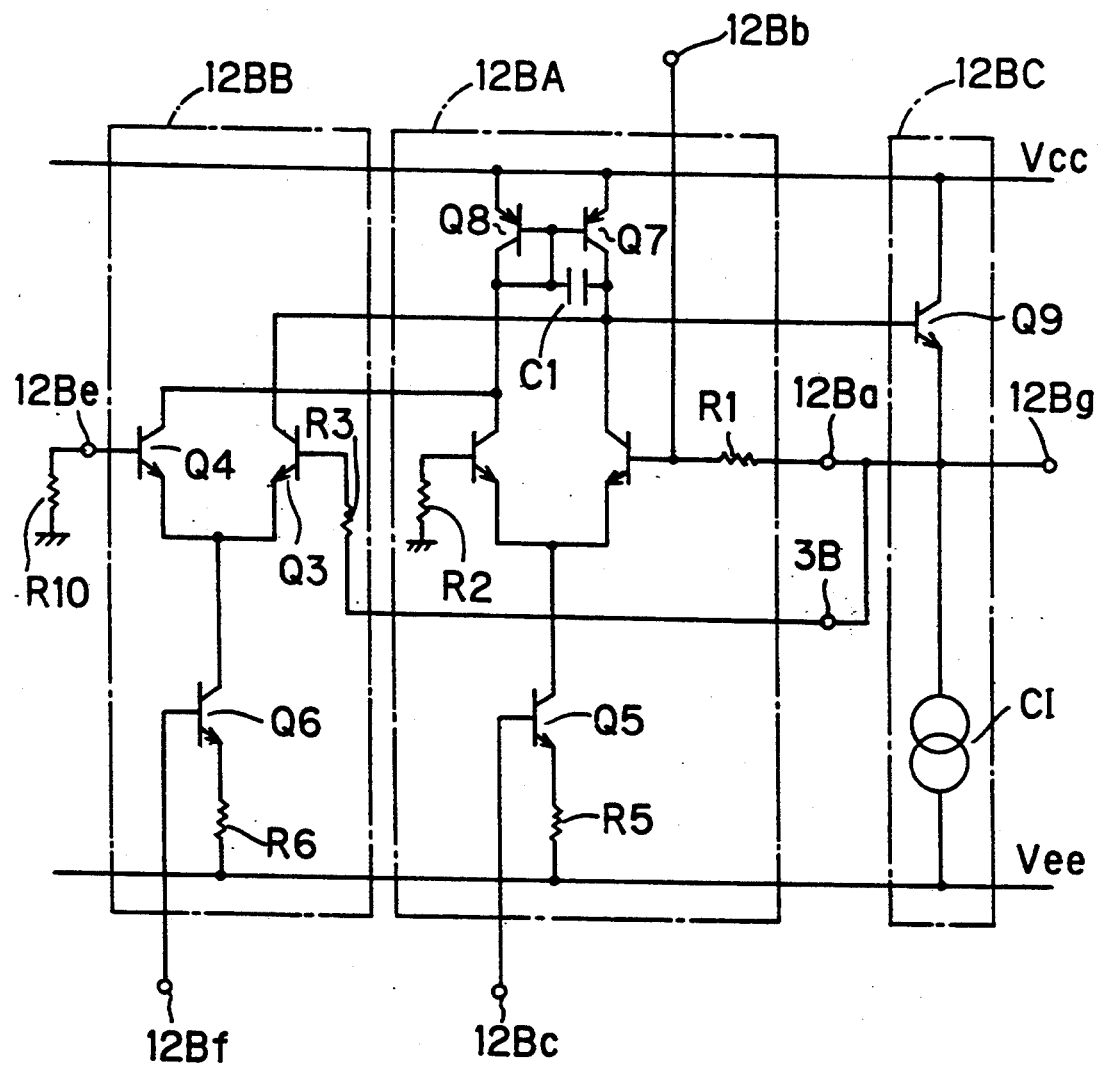
FIG. 8 is a diagram of input signal supply means which is provided for a computation circuit.

The circuits 12BA, 12BB and 12BC of FIG. 8, which are provided in association with the photo detector 1B, show exemplary circuit structures of the corresponding circuits; the circuit 12BA is an example of the current-/voltage conversion circuits for detected signals (12BA and 12DA to 12FA); the circuit 12BB is an example of the current/voltage conversion circuits for converted signals (12BB and 12DB to 12FB); and the circuit 12BC is an example of the converted signal output circuits (12BC and 12DC to 12FC). The circuits 12BA, 12BB and 12BC form an input signal supply circuit for the tracking error computation circuit 6.

The current/voltage conversion circuit 12BA receives a detected current from the photo detector 1B at an input terminal which is connected to a detected current input terminal 12B$b$. The current/voltage conversion circuit 12BA converts the detected current received at the detected current input terminal 12B$b$ only when a bias supply terminal 12B$c$ is impressed with a bias voltage. The resulting converted voltage is outputted at a detected voltage supply terminal 12B$a$.

An input terminal of the current/voltage conversion circuit 12BB is connected to a reference current supply terminal 12B$e$ which is connected to a ground resistor R10. Only a bias voltage impressed on the reference current supply terminal 12B$f$ can drive the current-/voltage conversion circuit 12BB to convert a reference current received at the reference current supply terminal 12B$e$ into a reference voltage which is outputted at the reference current supply terminal 12B$e$.

The current/voltage conversion circuit 12BA includes NPN transistors Q1 and Q2 which form a differential input stage, while the current/voltage conversion circuit 12BB includes NPN transistors Q3 and Q4 which also form a differential input stage. The collector of the NPN transistor Q1 of the circuit 12BA is connected to the collector of the NPN transistor Q3 of the circuit 12BB. Likewise, the collector of the NPN transistor Q2 of the circuit 12BA is connected to the collector of the NPN transistor Q4 of the circuit 12BB. The base of the NPN transistor Q1 has one terminal connected to the detected current input terminal 12B$b$ and other terminal connected to a resistor R1 which is connected to the detected voltage supply terminal 12B$a$ of the circuit 12BA. The base of the NPN transistor Q2 is connected to a resistor R2 which has its one terminal grounded. The base of the NPN transistor Q3 is connected to a resistor R3 which has its one terminal connected to the reference voltage supply terminal 3B. The base of the NPN transistor Q4 is connected to the reference current supply terminal 12B$e$.

The emitters of the NPN transistors Q1 and Q2 are connected to the collector of an NPN transistor Q5. The emitters of the NPN transistors Q3 and Q4 are connected to the collector of an NPN transistor Q6. The bases of the NPN transistors Q5 and Q6 are connected to the bias supply terminals 12B$c$ and 12B$f$, respectively. The emitters of the NPN transistors Q3 and Q6 are connected to a minus power source Vee through resistors R5 and R6, respectively.

The collectors of the NPN transistors Q1 and Q3 are connected to the collector of a PNP transistor Q7 which has its emitter connected to a plus power source Vcc. In a similar manner, the collectors of the NPN transistors Q2 and Q3 are connected to the collector of a PNP transistor Q8 which has its emitter connected to the plus power source Vcc. The bases of the NPN transistors Q5 and Q6 are connected to each other. The base and the collector of the PNP transistor Q7 are short circuited, while the base and the collector of the PNP transistor Q8 are connected to each other via a capacitor C1.

The switching circuit 15B applies the bias voltage to one of the bias supply terminals 12B$c$ and 12B$f$. As a result, one of the circuits 12BA and 12BB is actuated in response to its pertaining bias supply terminal being biased. Hence, a detected voltage is available at the detected voltage supply terminal 12B$a$ when the bias voltage is applied to the bias supply terminal 12B$c$, whereas the reference voltage, i.e., the ground potential is available at the reference voltage supply terminal 3B when the bias voltage is applied to the bias supply terminal 12B$f$.

The converted signal output circuit 12BC comprises an NPN transistor 9 and a constant current source CI. The NPN transistor 9 has its emitter connected to the plus power source Vcc and its base connected to the NPN transistors Q1 and Q3. The constant current source CI is connected from the emitter of the NPN transistor Q9 to the minus power source Vee. The emitter of the NPN transistor Q9 is also connected to the detected voltage supply terminal 12B$a$, the reference voltage supply terminal 3B and an output terminal 12B$g$. When the detected voltage is available at the detected voltage supply terminal 12B$a$, the detected voltage is outputted at the output terminal 12B$g$. On the other hand, the reference voltage is available at the output terminal 12B$g$ when the reference voltage is given to the reference voltage supply terminal 3B.

The circuit structures of the circuits 12BA, 12BB and 12BC as above may be adopted for the current/voltage conversion circuits for detected currents 12DA to 12FA, the current/voltage conversion circuits for reference currents 12DB to 12FB and the converted signal output circuits 12DC to 12FC. In FIG. 7, what corresponds to the detected voltage supply terminal 12B$a$ are terminals 12D$a$, 12E$a$ and 12F$a$, what correspond to the detected current supply terminal B$b$ are terminals 12D$b$, 12E$b$ and 12F$b$, what correspond to the detected current supply terminal 12B$e$ are terminals 12D$e$, 12E$e$ and 12F$e$, and what correspond to the reference voltage supply terminal 3B are terminals 3D, 3E and 3F.

Figure 9:
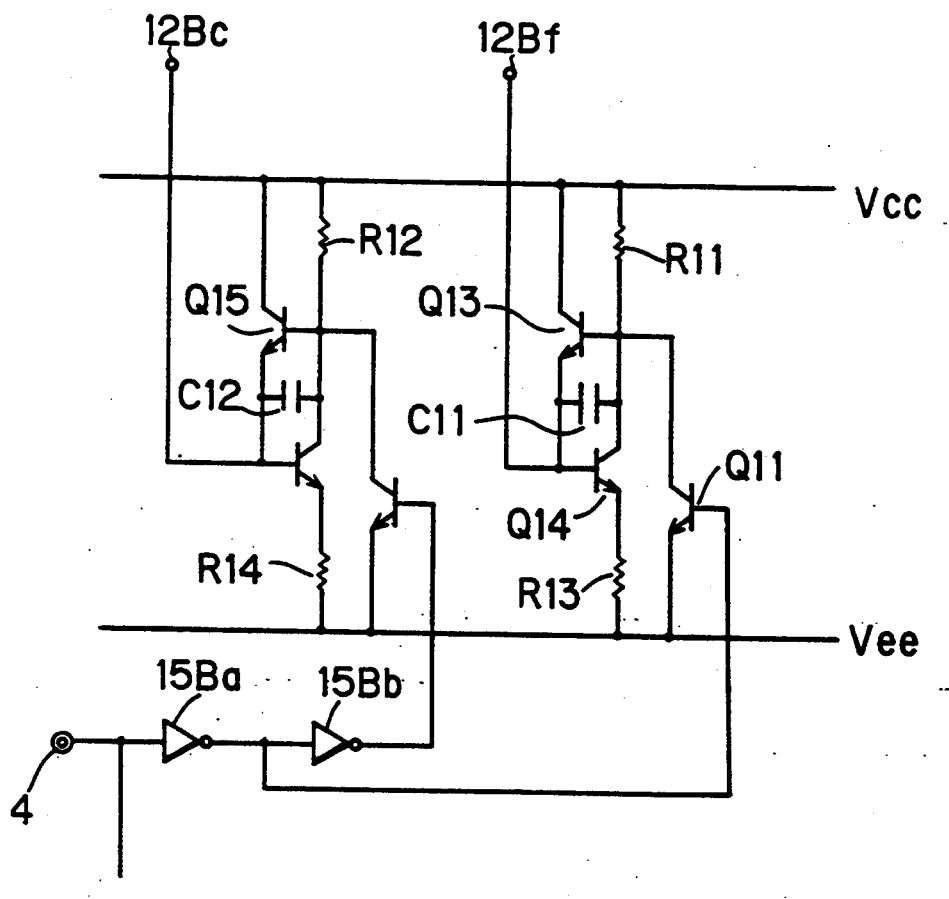
FIG. 9 illustrates an exemplary circuit structure of a bias control circuit.

The bias control circuits 15B and 15D to 15F play the roles of the switching circuits 5B and 5D to 5F of the semiconductor integrated circuit of FIG. 3, respectively. That is, the bias control circuits 15B and 15D to 15F select a signal to be given to the tracking error computation circuit 6 and the focusing error computation circuit 7 in response to a test signal supplied to the test terminal 4. An exemplary circuit structure of each bias control circuit is shown in FIG. 9 as a circuit 15B.

The bias control circuit 15B supplies the bias voltage to the bias supply terminal 12B$c$, which is provided for the current/voltage conversion circuit 12BA, or otherwise to the bias supply terminal 12B$f$, which is provided for the current/voltage conversion circuit 12BB, in response to a test signal supplied to the test terminal 4.

The bias control circuit 15B comprises an invertor 15Ba which is connected to the test terminal 4 and another invertor 15Bb which is connected to the invertor 15Ba. An output terminal of the invertor 15Ba is connected to the base of an NPN transistor Q11 while an output terminal of the invertor Bb is connected to the base of an NPN transistor Q12. The collector of the NPN transistor Q11 is connected to the base of an NPN transistor Q13 and the collector of an NPN transistor Q14. The collector of the NPN transistor Q12 is connected to the base of an NPN transistor Q15 and the collector of an NPN transistor Q16. The collectors of the NPN transistors Q13 and Q15 are connected to the plus power source Vcc. The bases of the NPN transistors Q13 and Q15 are also connected to the plus power source Vcc but through resistors R11 and R12, respectively. The emitters of the NPN transistors Q13 and Q15 are connected to the bases of the NPN transistors Q14 and Q16, respectively, Capacitors C11 and C12 are connected between the base of the transistor Q13 and the emitter of the transistor Q15, that is, between the base of the transistor Q14 and the connector of the transistor Q16. The emitter of the NPN transistor Q13 and the base of the NPN transistor Q14 are connected to the bias supply terminal 12Bf. The emitter of the NPN transistor Q15 and the base of the NPN transistor Q16 are connected to the bias supply terminal 12Bc. The emitters of the NPN transistors Q14 and Q16 are connected to the minus power source Vee through resistors R13 and R14, respectively.

In the bias control circuit 15B tailored as above, the NPN transistor Q11 turns off and the NPN transistor Q12 turns on in response to the logical high signal received at the test terminal 4. The turning off of the NPN transistor Q11 is followed by turning on of the NPN transistor Q13, which in turn effects the conduction of the NPN transistor Q14. As a result, a bias voltage which corresponds to a current R13 flowing in the resistor R13 is developed at the bias terminal 12Bf. This initiates a current I6 in the resistor R13 of the current-/voltage conversion circuit 12BB since the transistor Q14 and the resistor R6 of the current/voltage conversion circuit 12BB form a current mirror circuit. The current I6 is expressed as $I6=(R13/R16) \cdot I13$. On the other hand, if the NPN transistor Q12 is effective, the NPN transistor Q15 and hence the NPN transistor Q16 turn off, or become disabled. In this case, the bias terminal 12Bc goes as low as the potential at the minus power supply Vee, with a consequence that the bias voltage is not developed at the bias terminal 12Bc.

When the bias control circuit 15B is operable for the functional tests in response to the logical low signal received at the test terminal 4, the NPN transistor Q11 turns on and the NPN transistor Q12 turns off. The conduction of the NPN transistor Q11 disables the NPN transistors Q13 and Q14, thereby developing no bias voltage at the bias terminal 12Bf. With the NPN transistor Q12 turned off, the NPN transistors Q15 and Q16 turn on. As a result, a bias voltage which corresponds to a current I14 flowing in the resistor R14 is developed at the bias terminal 12Bc, initiating a current I5 at the resistor R5 of the current/voltage conversion circuit 12BA. The current I5 is expressed as $I5=(R14/R5) \cdot I14$.

The circuit structure of the bias control circuit 15B may be directly used for the other bias control circuits 15D to 15F. In FIG. 7, the corresponding elements of the bias control circuits 15D to 15F are not drawn except for the bias terminals 12Dc and 12Df, 12Ec and 12Ef, 12Fc and 12Ef which are equivalent to the bias terminals 12Bc and 12Bf.

As described above, when the semiconductor integrated circuit of FIG. 7 is in its regular operation, i.e., when the logical high signal is received at the test terminal 4, a bias voltage is developed at the bias terminals 12Bc, 12Dc, 12Ec and 12Fc but no bias voltage is developed at the bias terminals 12Bf, 12Df, 12Ef and 12Ff. This triggers the current/voltage conversion circuits 12BA and 12DA to 12FA into conduction and renders the current/voltage conversion circuits 12BB and 12DB to 12FB nonconductive, thereby providing all of the detected voltage supply terminals 12Aa to 12Fa with detected voltages which are obtained by converting detected currents detected by the photo detectors 1A to 1F. Thus, the tracking error computation circuit 6 outputs, at its output terminal $Q_{TR}$, the signal $S_{TR}$ which has a value corresponding to a tracking error which is found from the detected currents detected by the photo detectors 1A and 1B. Likewise, the focusing error computation circuit 7 outputs, at its output terminal $Q_{FE}$, the signal $S_{FE}$ which has a value corresponding to a focusing error which is found from the detected currents detected by the photo detectors 1C to 1F.

The logical low signal received at the test terminal 4 brings the semiconductor integrated circuit of FIG. 7 into the functional test mode. In response to this, a bias voltage is developed at the bias terminals 12Bf, 12Df, 12Ef and 12Ff. However, the bias voltage is not developed at the bias terminals 12Bc, 12Dc, 12Ec and 12Fc. This renders the current/voltage conversion circuits 12BB and 12DB to 12FB nonconductive but triggers the current/voltage conversion circuits 12BA and 12DA to 12FA into conduction. As a result, the detected voltage supply terminals 12Aa and 12Ca receive detected voltages which are obtained by converting detected currents detected by the photo detectors 1A and 1C. Meanwhile, the detected voltage supply terminals 12Ba and 12Da to 12Fa remain detected-voltage starved and the reference voltage supply terminals 3B and 3D to 3F are provided with the ground potential, or the reference voltage. Hence, the tracking error computation circuit 6 outputs at its output terminal $Q_{TR}$ the detected voltage obtained from the detected current detected by the photo detector 1A as the tracking function signal $S_{TRT}$. On the other hand, the focusing error computation circuit 7 outputs at its output terminal $Q_{FE}$ the detected voltage obtained from the detected current detected by the photo detector 1C as the focusing function signal $S_{FET}$. Similarly to the first preferred embodiment, the tracking function signal $S_{TRT}$ and the focusing function signal $S_{FET}$ show whether the tracking function and the focusing function of the semiconductor integrated circuit are not defective.

The preferred embodiments of FIGS. 3 to 7 require that the computation circuits are provided with the detected voltage via its respective one input terminal when a test signal is received at the test terminal. However, the computation circuits may comprise two or more input terminals for receiving the detected voltage or the reference voltage depending on the content of the functional tests. For example, such an expedient is possible in which the computation circuits each receive the reference voltage at its at least one input terminal and receive the detected reference at its other input terminals.

In addition, although the foregoing has described that the computation circuits are responsible only for the computation for the tracking and the focusing functions, additional roles may be assigned to the computation circuits. Hence, as far as two or more photo detectors are associated with each computation circuit, the number of the photo detectors is not limited to as herein described.

While the invention has been described in detail, the foregoing description is in all aspects illustrative and not restrictive. It is understood that numerous other modifications and variations can be devised without departing from the scope of the invention.

We claim:

1. A semiconductor integrated circuit incorporating photo detectors, comprising:
    four or more photo detectors for outputting detected currents in accordance with their respective light receiving areas;
    detected current supply terminals each associated with each one of said photo detectors, each one of said detected current supply terminals receiving a detected current from its pertaining photo detector;
    a plurality of computation circuits provided in association with two or more photo detectors selected from said four or more photo detectors, said computation circuits each receiving as many input signals as its pertaining photo detectors and executing computation needed for desired functions in accordance with said input signals;
    a test terminal for receiving a test signal from off of the semiconductor integrated circuit incorporating said photo detectors which instructs to perform a test of said semiconductor integrated circuit incorporating said photo detectors;
    reference voltage supply terminals, at least one of said reference voltage supply terminals being associated with each one of said computation circuits, said reference voltage supply terminals being associated with some of said detected current supply terminals which receive detected currents from the pertaining photo detectors of said selected two or more photo detectors which are associated with said computation circuits;
    reference voltage supply means for providing said reference voltage supply terminals with a reference voltage;
    first input signal supply means which are disposed in association with said reference voltage supply terminals and which are connected to said test terminal, said first input signal supply means each being:
        responsive to the absence of the test signal at said test terminal to provide its pertaining computation circuit with a detected voltage which is generated by current-to-voltage conversion of a detected current received at a respective one of said detected current supply terminals which is associated with its pertaining reference voltage supply terminal, the detected voltages being given to said computation circuits as input signals; and
        responsive to the test signal given to said test terminal to provide its pertaining computation circuit with a reference voltage which is received at its pertaining reference voltage supply terminal, the reference voltages being given to said computation circuits as input signals; and
    second input signal supply means including a current/voltage convertor, said current/voltage convertor converting, into detected voltages, detected currents which are supplied to the detected current supply terminals which are associated with the photo detector except said pertaining photo detector of said selected two or more photo detectors, said second input signal supply means supplying the detected voltages as input signals to input terminals of computation circuits which are associated with the photo detector except said pertaining photo detector of said selected two or more photo detectors.

2. The semiconductor integrated circuit incorporating photo detectors of claim 1, wherein said first input signal supply means each include:
    a current/voltage convertor for converting a detected current supplied to its pertaining detected current supply terminal which is associated with a respective one of said pertaining photo detector of said selected two or more photo detectors into a detected voltage;
    a detected voltage supply terminal for receiving the detected voltage from said current/voltage convertor; and
    a switch circuit, said switch circuit connecting said detected voltage supply terminal to its pertaining computation circuit when the test signal is not given to said test terminal, said switch circuit disconnecting said detected voltage supply terminal from the computation circuit and connecting its associated reference voltage supply terminal to the computation circuit when the test signal is given to said test terminal.

3. The semiconductor integrated circuit incorporating photo detectors of claim 2, wherein said desired functions include a tracking function and a focusing function, and therefore, the encountered application of the semiconductor integrated circuit is an use within an optical pick-up device of an optical disc player.

4. The semiconductor integrated circuit incorporating photo detectors of claim 3, wherein photo detectors for the tracking function include photo detectors for detecting light reflected at a mirror surface on the outer periphery side of a track of an optical disc and photo detectors for detecting light reflected at a mirror surface on the inner periphery side of said track.

5. The semiconductor integrated circuit incorporating photo detectors of claim 3, wherein four photo detectors are provided for testing the focusing function, said four photo detectors being disposed checkerwise so their light receiving areas are contiguous to each other, reflected light from said signal generating surface of said optical disc being converged by astigmatism method so that said four photo detectors receive the converged light at a center portion of their light receiving areas taken as a whole.

6. The semiconductor integrated circuit incorporating photo detectors of claim 2, wherein said switch circuit is a transmission gate.

7. The semiconductor integrated circuit incorporating photo detectors of claim 2, wherein the reference voltage is a ground potential.

8. The semiconductor integrated circuit incorporating photo detectors of claim 1, further comprising:
    control means, said control means generating a first predetermined signal in response to the absence of the test signal at said test terminal, said control means generating a second predetermined signal in response to the test signal received at said test terminal;

detected voltage supply terminals corresponding to said reference voltage supply terminals; and input signal supply circuits, each one of said input signal supply circuits connecting its pertaining detected voltage supply terminal and its pertaining reference voltage supply terminal to the same input terminal of its associated computation circuit, wherein said first input signal supply means each include a current/voltage convertor equipped with a switching circuit, said current/voltage convertor in response only to the first predetermined signal converts a detected current which is supplied to its associated detected current supply terminal which is connected to a respective one of said pertaining photo detector of said selected two or more photo detectors into a detected voltage; and said reference voltage supply means each include a switch circuit, said switch circuit providing its pertaining reference voltage supply terminal with the reference voltage in response only to the second predetermined signal.

9. The semiconductor integrated circuit incorporating photo detectors of claim 8, wherein said desired functions include a tracking function and a focusing function, and therefore, the encountered application of the semiconductor integrated circuit is an use within an optical pick-up device of an optical disc player.

10. The semiconductor integrated circuit incorporating photo detectors of claim 9, wherein photo detectors for the tracking function include photo detectors for detecting light reflected at a mirror surface on the outer periphery side of a track of an optical disc and photo detectors for detecting light reflected at a mirror surface on the inner periphery side of said track.

11. The semiconductor integrated circuit incorporating photo detectors of claim 9, wherein four photo detectors are provided for testing the focusing function, said four photo detectors being disposed checkerwise so their light receiving areas are contiguous to each other, reflected light from said signal generating surface of said optical disc being converged by astigmatism method so that said four photo detectors receive the converged light at a center portion of their light receiving areas taken as a whole.

12. The semiconductor integrated circuit incorporating photo detectors of claim 8, wherein said current/voltage convertor each equipped with a switching circuit of said first input signal supply means and said switch circuits of said reference voltage supply means are transistor circuits, and the first and the second predetermined signals are bias voltages.

13. A semiconductor integrated circuit incorporating photo detectors according to claim 1, further comprising:

means, disposed off of said semiconductor integrated circuit incorporating said photo detectors and connected to the test terminal, for generating said test signal.

* * * * *